United States Patent [19]
Calhoun et al.

[11] Patent Number: 5,883,762
[45] Date of Patent: Mar. 16, 1999

[54] ELECTROPLATING APPARATUS AND PROCESS FOR REDUCING OXIDATION OF OXIDIZABLE PLATING ANIONS AND CATIONS

[76] Inventors: Robert B. Calhoun, 66 Reed St. Ct. #2, Cambridge, Mass. 02140; Earl C. Johns, 363 Whitney St., Northboro, Mass. 01532

[21] Appl. No.: 818,472

[22] Filed: Mar. 13, 1997

[51] Int. Cl.⁶ .................................................. G11B 5/127
[52] U.S. Cl. ........................................... 360/113; 205/119
[58] Field of Search ............................. 205/90, 119, 50; 360/110, 113, 122; 521/27

[56] References Cited

U.S. PATENT DOCUMENTS

| | | | |
|---|---|---|---|
| 3,716,464 | 2/1973 | Kovac et al. | 204/43 |
| 3,755,131 | 8/1973 | Shalit | 204/246 |
| 4,003,768 | 1/1977 | Anderson et al. | 148/108 |
| 4,102,756 | 7/1978 | Castellani et al. | 204/43 |
| 4,207,151 | 6/1980 | Franke et al. | 204/73 |
| 4,279,707 | 7/1981 | Anderson et al. | 204/43 T |
| 4,445,984 | 5/1984 | Tison | 204/49 |
| 5,011,581 | 4/1991 | Omata | 204/38.4 |
| 5,173,170 | 12/1992 | Brown et al. | 205/96 |
| 5,287,237 | 2/1994 | Kitada et al. | 360/113 |
| 5,372,698 | 12/1994 | Liao | 205/90 |
| 5,435,903 | 7/1995 | Oda et al. | 205/77 |
| 5,448,822 | 9/1995 | Wu et al. | 29/603 |
| 5,482,680 | 1/1996 | Wilkinson et al. | 422/177 |
| 5,483,402 | 1/1996 | Batra | 360/113 |
| 5,516,418 | 5/1996 | Doss et al. | 205/119 |
| 5,626,731 | 5/1997 | Cooley et al. | 204/296 |
| 5,643,456 | 7/1997 | Smith et al. | 210/651 |
| 5,705,050 | 1/1998 | Sampson et al. | 205/687 |
| 5,714,521 | 2/1998 | Kedem et al. | 521/27 |
| 5,785,833 | 7/1998 | Vaughan | 204/525 |

FOREIGN PATENT DOCUMENTS

| | | |
|---|---|---|
| 404297004 | 10/1992 | Japan . |
| WO 79/00040 | 2/1979 | WIPO . |
| WO 83/01630 | 5/1983 | WIPO . |

*Primary Examiner*—Kathryn Gorgos
*Assistant Examiner*—Erica Smith-Hicks
*Attorney, Agent, or Firm*—Janah & Associates; Debra A. Chun

[57] ABSTRACT

An electroplating apparatus and method reduces oxidation of thermodynamically unstable and oxidizable ionic species in an electroplating solution to deposit complex magnetic alloys onto substrates. In one embodiment, the electroplating apparatus comprises an electroplating cell in which oxidation of oxidizable anions and cations is reduced. The cell comprises (i) an anode compartment comprising an anode and anolyte solution; and (ii) a cathode compartment comprising a cathode and catholyte solution containing oxidizable plating anions. A cation-selective semi-permeable membrane separates the anode and cathode compartments. An electrical power supply is used to maintain a voltage across the anode and cathode. Upon application of the voltage to the anode and cathode, transport of the oxidizable plating anions, and to a lesser degree cations, to the anode is substantially blocked by the cation-selective semi-permeable membrane, thereby reducing oxidation of the oxidizable anions and cations at the anode. The concentration of the anolyte and catholyte solutions can be tailored, and an inert gas can be maintained above the solution surface in the cell, to further reduce oxidation of the oxidizable plating ions in the cell.

21 Claims, 7 Drawing Sheets

ELECTROPLATING APPARATUS AND PROCESS FOR REDUCING OXIDATION OF OXIDIZABLE PLATING ANIONS AND CATIONS

BACKGROUND

The present invention relates to electroplating apparatus and processes, and in particular to electroplating techniques used for forming ferromagnetic films on magnetic tape heads and magnetoresistive sensors.

Electroplating processes are used to form a variety of coatings including protective and corrosion resistant coatings, jewelry and decorative coatings, and magnetic or electrical coatings. Electroplating is typically performed in an electrolytic cell comprising (i) an anode (positive electrode) having a positive voltage applied thereto, which can have the same chemical composition as the material being plated; and (ii) a cathode (negative electrode) having a negative voltage applied thereto, and which is typically the object to be electroplated (usually a metal, ceramic, or polymer structure). An electroplating solution or bath encompassing the anode and cathode contains plating ions of the metals being plated in a suitable solvent, e.g., $Cu^{2+}$ and $Ni^{2+}$ in water. When a potential is applied to the electrodes, the cations (positive ions) in the electroplating solution travel to the cathode, and the anions (negative ions) travel to the anode. In the electroplating process, metallic plating cations deposit on the cathode to form a thin layer of metal plating (such as chromium, copper, nickel, iron, silver, and/or cobalt) when an electric current is passed through the aqueous salt solution.

Electrodeposition from aqueous baths of the salts of ferromagnetic metals is commonly used to manufacture magnetic alloy films that form magnetic poles and shields, of magnetic sensors and heads on disk drives and tape drives. These magnetic devices use magnetically anisotropic films that are formed by electroplating a magnetic alloy under the influence of an orienting magnetic field. The electroplated film exhibits magnetic anisotropy in the plane of the film, the direction of the orienting field applied during deposition becoming the longitudinal, preferred, or easy axis of magnetization in the plated coating; and the orthogonal direction becoming the transverse or hard axis of magnetization. It is desirable for the electrodeposited magnetic film to have a large high frequency magnetic permeability. Such magnetic films have a magnetic anisotropy; directional fields are typically used to switch the device from one direction to another. The reversal of a magnetically anisotropic film takes place by rotational switching techniques, as opposed to domain wall switching which is much slower and more noisy. It is also desirable for the magnetic film to have a high permeability to support a large magnetic flux at relatively high frequencies at which the film switches magnetization states by rotation, typically at frequencies from about 0.1 MHZ to about 100 MHZ. High permeability can be maintained at high frequencies with the use of magnetic material having a high resistivity, which reduces the power loss arising from eddy currents.

Typical magnetic thin film heads are made using layers of magnetic materials, such as alloys of nickel, iron, and/or cobalt, for example PERMALLOY comprising $Ni_{82}Fe_{18}$ which has a relatively high saturation magnetization of about 10,000 Gauss (the saturation magnetization ($M_s$) is the magnetization provided when all the domains in the magnetic material are aligned) and a low resistivity of about 20 $\mu\Omega$-cm. Modern magnetic materials used to fabricate thin films include for example, CoNiFeX, NiFeX, and CoFeX alloys, where X is an element that increases the resistivity while not substantially lowering the magnetic moment or degrading magnetic anisotropy. Examples of metals which can be used as X include Cr, Mo, V, Cu, Rh, and Sn, and non-metals include P and B. These elements increase the electrical resistivity of the ferromagnetic material and improve its permeability at high frequencies, to enhance the performance of the magnetic thin film head. Elements such as P and B are particularly desirable because they form glassy or microcrystalline alloys that have high electrical resistance and soft magnetic properties.

Figure 1:
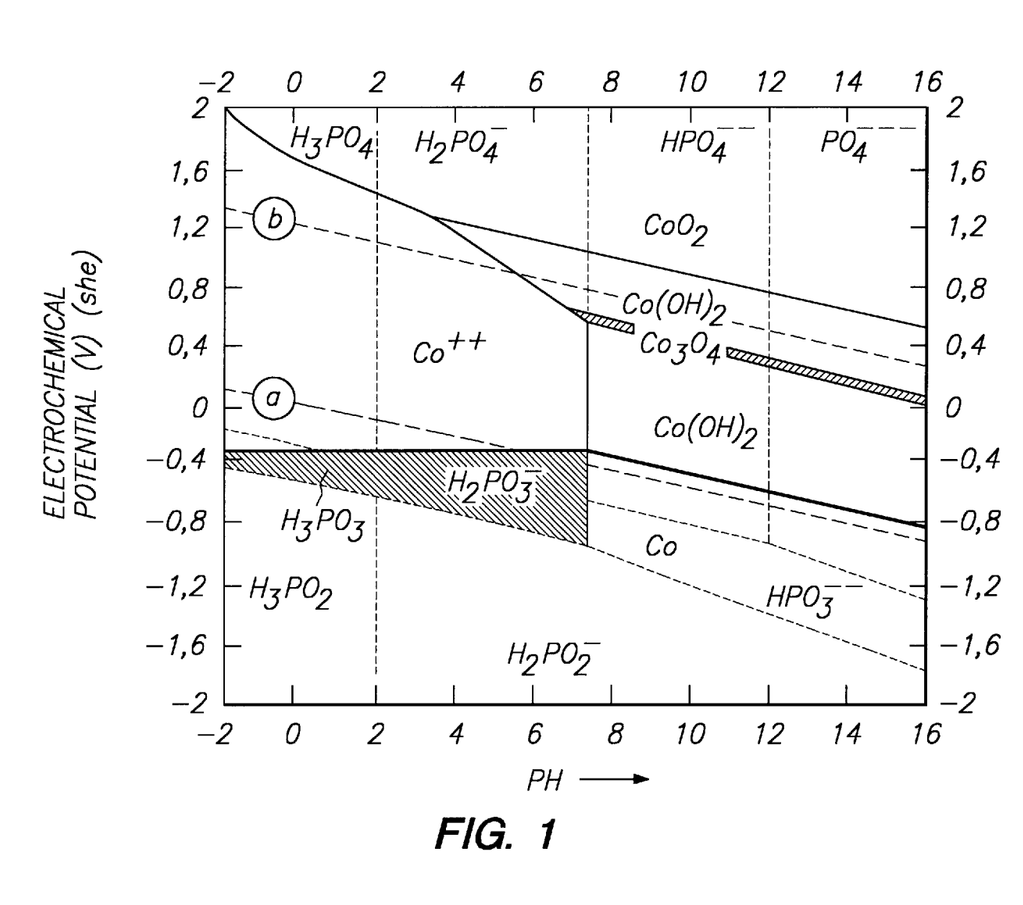
FIG. 1 is a POURBAIX diagram of cobalt-containing anions and oxidizable phosphorous-containing cations.

However, problems arise in the electroplating of complex alloys, such as, CoFeX, NiFeX, CoNiX, or CoNiFeX alloys, because it is difficult to form a stable electroplating solution that contains the desired combinations of elements, particularly for X elements such as P, B or Mo; and other elements such as iron. For example, such X elements cannot be added to the solution in the form of anions in their highest stable oxidation state because the simple ionic compounds of such elements are not stable. Thus, these elements are typically added to the electroplating solution in the form of oxo-acids or the salts of oxo-acids, such as sodium molybdate for Mo additions or sodium hypophosphite for phosphorus additions. These compounds, such as $HPO_3^{-2}$ are unstable relative to more stable ionic species such as $PO_4^{-2}$. Such unstable ions (e.g., $HPO_3^{-3}$) diffuse to and oxidize at the anode, often irreversibly, to become either unavailable for deposition reactions at the cathode, or to form species that inhibit other necessary deposition reactions. The thermodynamics of an exemplary electroplating process is summarized in Pourbaix (electrochemical potential vs. pH) diagrams of the ionic species, as shown in FIG. 1, which is an overlay of the Pourbaix diagram for cobalt and phosphorus ions, both of which are used in many electroplating processes. The Pourbaix diagram shows the stability of the various cobalt and phosphorous containing ions for increasing pH of the solution (x-axis) and electrochemical potential applied to the substrate to be electroplated (y-axis). The graph demonstrates that at a pH of 2 to 3, which is the typical pH of the electroplating solutions, both sodium orthophosphite and sodium hypophosphite are relatively thermodynamically unstable at the electrochemical potentials needed to dissolve cobalt from a cobalt containing anode, namely at potentials greater than −0.4 volts versus the conventional hydrogen cell. At these conditions, the orthophosphite and hypophosphite anions diffuse across the solution to contact the anode and become oxidized to the phosphate anion ($PO_4^{-3}$). Because the phosphate anions are too thermodynamically stable to be reduced at the cathode, the phosphate anions reduce the current efficiency of the cell. Also, the phosphate anions often combine with other metal ions to precipitate out as insoluble phosphate compounds in the electroplating solution. Thus it is desirable to reduce or prevent the unstable oxidizable anions from traveling to and oxidizing at the anode.

The electroplating cell can contain unstable cation species that are also easily oxidized at the anode; for example, ferrous cations ($Fe^{+2}$) can become oxidized to ferric cations ($Fe^{+3}$) at the anode. This is undesirable, because ferric ions often precipitate out of solution. Yet another problem that arises when incorporating easily oxidizable species in a plating bath is that these species oxidize on contact with oxygen in ambient air surrounding the electroplating solution. However, the oxidizable species are often desirable at the cathode to allow deposition of such species on the substrate being electroplated. For example, ferrous cations ($Fe^{+2}$) are needed to deposit CoFeP alloys that have highly desirable magnetic properties.

Another problem arises because the fundamental nature of electrodeposition processes requires that a reducing potential be present at the cathode and an oxidizing potential at the anode. Thus all electrodeposition processes which rely on the presence of a thermodynamically unstable species potentially suffer from undesirable oxidation or reduction of these species at the anode or cathode. The oxidized ionic species are undesirable because they remain in the electroplating bath as an additional non-reactive component that competes in the electromigration process, as a "spoiler" which impairs the cathodic electrodeposition process, or as a precipitated material. In the former case, additional quantities of the thermodynamically unstable ionic species must be continuously added to the electroplating solution; and in the latter case, the entire electroplating solution must be purified or rejected. Oxidization of thermodynamically unstable species in the cell often results in poor electroplating performance, non-uniform deposition, variable electrical and magnetic properties in the plated coating, and shortened use lifetime for the electroplating solution bath.

Thus it is desirable to have an electroplating apparatus and method that reduces or altogether prevents oxidation of thermodynamically unstable ionic species in the electroplating solution of the apparatus. It is further desirable to have an electroplating apparatus and method that can be used to uniformly deposit complex magnetic alloys onto substrates, and that can be easily adapted to deposit different alloy compositions.

SUMMARY

The present invention satisfies these needs by providing an electroplating apparatus and method that provides reduced oxidation of thermodynamically unstable anionic or cationic species in an electroplating solution, and allows uniform deposition of complex magnetic alloys on substrates. In one embodiment, the electroplating apparatus comprises an electroplating cell having (1) an anode compartment comprising an anode in anolyte solution, and (2) a cathode compartment comprising a cathode in catholyte solution containing oxidizable plating anions. A cation-selective semi-permeable membrane serves as a divider that is positioned between and separates the anode and cathode compartments. An electrical power supply is used to maintain a voltage across the anode and cathode. Upon application of a voltage across the anode and cathode, transport or travel of the oxidizable plating anions to the anode is substantially blocked by the cation-selective semi-permeable membrane, thereby reducing oxidation of the oxidizable plating anions at the anode. Preferably, the cation-selective semi-permeable membrane comprises mobile cations in a negatively charged polymer matrix.

The composition of the anolyte and/or catholyte solutions in the cell is tailored to also reduce transport and oxidation of particular oxidizable plating cations at the anode. Thus, preferably, the anolyte solution comprises non-oxidizable plating cations, and the catholyte solution comprises non-oxidizable plating cations, oxidizable plating cations, and perhaps oxidizable anions with the semi-permeable membrane separating the two solutions. The concentration of non-oxidizable plating cations in the anolyte and catholyte solutions is maintained sufficiently higher than the concentration of oxidizable plating cations in the catholyte solution, so that upon application of the voltage across the anode and cathode, the non-oxidizable plating cations form the majority or dominant cationic charge carrier species that travel across the semi-permeable membrane.

In yet another embodiment, the electroplating apparatus reduces oxidation of oxidizable plating ions (both cations and anions) by maintaining an inert gas above the electroplating solution surface in the cell. The apparatus comprises an electroplating cell having (i) an anode and a cathode, (ii) electroplating solution containing oxidizable ions, (iii) an enclosed region above a surface of the electroplating solution, and (iv) a gas inlet for introducing gas to the enclosed region. A gas flow controller is used to introduce non-oxidizing gas in the enclosed region via the gas inlet to maintain non-oxidizing gas above the surface of the electroplating solution to limit exposure of the electroplating solution to air. This significantly reduced oxidation of the oxidizable ions in the electroplating solution. Preferably, the non-oxidizing gas comprises argon, xenon, krypton, neon, nitrogen, and mixtures thereof; and can also comprise a reducing gas such as hydrogen or methane.

The apparatus and methods described herein are particularly useful for forming magnetic heads and sensors. In this process, a patterned resist layer with resist features is formed on a substrate. Ferromagnetic material comprising oxidizable plating cations and anions is deposited between the resist features to form the magnetic head or sensor. The resultant magnetic head has superior and more uniform magnetic and electrical properties.

DRAWINGS

These and other features, aspects, and advantages of the present invention will be better understood from the following drawings, description, and appended claims, all of which provide illustrative examples of the invention, where:

FIG. 4b is an exploded side view of the anode compartment of FIG. 4a;

FIG. 6b is a partial sectional schematic view of the magnetic head of FIG. 6a;

DESCRIPTION

The present invention can be used in any electroplating process, including processes used for the manufacture of semiconductor devices, magnetic recording and reading devices, electronic devices and display devices. Metals and alloys that can be electroplated using the present invention include for example, antimony, bismuth, cadmium, chromium, cobalt, copper, iron, lead, magnesium, manganese, molybdenum, nickel, palladium, strontium, tin, tungsten, vanadium, zinc, and mixtures thereof. For example, protective electroplated coatings can be fabricated from copper, nickel, chromium, silver, gold, zinc, rhodium, and alloys thereof; and reflective coatings are commonly fabricated from silver, chromium, or gold. The present process is particularly useful for forming magnetic poles and shields, which are used in magnetoresistive sensors and thin film magnetic heads to perform "read" and/or "write" operations on magnetic storage media (such as for example disk drives, tape drives, and magnetic drums), and in bubble memory devices. Magnetic coatings are typically fabricated from metals such as for example nickel, iron, cobalt, chromium, molybdenum, vanadium, copper, rhodium, tin; and non-metals such as for example, phosphorous and boron.

Figure 2:
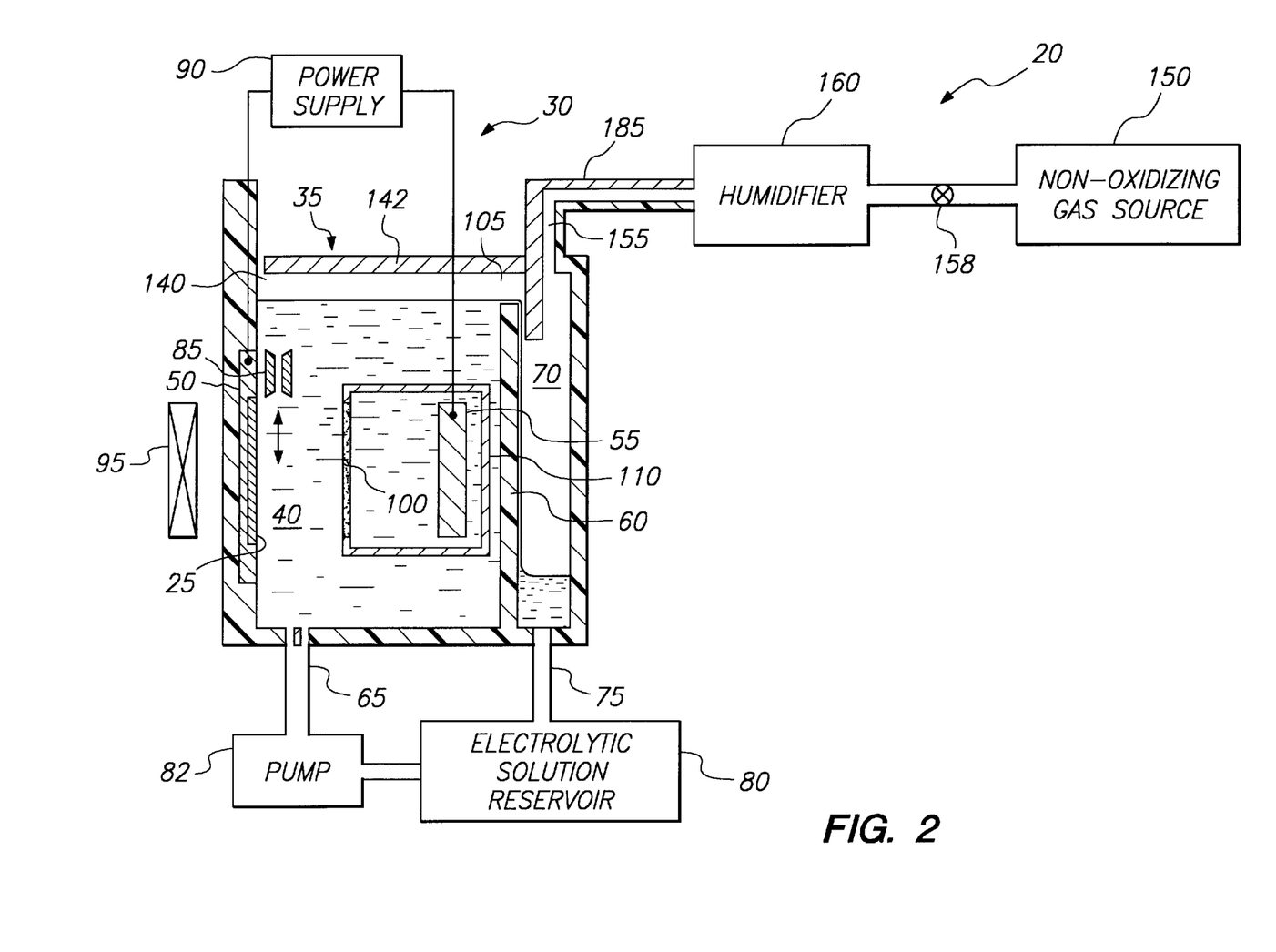
FIG. 2 is a schematic partial sectional view of an electroplating system of the present invention.

The present invention is described in the context of a particular electrochemical system, as shown in FIG. 2, that is useful for forming plated electrical and magnetic coatings on a substrate 25. However, it should be understood that the present invention can be used in other electroplating cells, as would be apparent to one of ordinary skill in the art, and should not be limited in scope to the exemplary systems described herein. Referring to FIG. 2, the electroplating cell 30 generally comprises a container 35 having electrolytic or electroplating solution 40 therein. The electroplating solution 40 contains an electrolyte, i.e., a substance that will provide ionic conductivity.

Typically, the electroplating solution 40 comprises a solvent, such as deionized or distilled water; and a composition of soluble salts which are dissolved in the solvent. The composition of the soluble salts is selected to provide the desired concentration of species in the solution 40 to provide the desired magnetic alloy composition, such as CoNiFeX, NiFeX, or CoFeX, where X can include metals such as Cr, Mo, V, Cu, Rh, and Sn, and non-metals such as P and B. Suitable metal salts include borate, phosphite, orthophosphite, hypophosphite, chloride, sulfate, fluoride, and cyanide salts. For example, a suitable solution for deposition of Permalloy comprises nickel ion in a concentration of 10 to 14 g/l; iron (ferrous) ion in a concentration of 0.1 to 1 g/l; boric acid at 0.3 to 0.5M; and an electrolyte such as sodium chloride at 0.3 to 0.5M. In another example, CoFeP alloys can be deposited from soluble cobalt, iron and phosphorous salts, for example a solution comprising cobaltous sulfate at 1.0M; ferrous chloride at 0.060M; phosphorous acid at 0.050M; trisodium citrate at 0.050M; boric acid at 0.125M; and sodium laurel sulfate at 0.1 g/l, the solution having a pH of about 2.3 to 2.6. Other chemicals can also be present in the electroplating solution 40, including organic complexing agents, buffering agents, and additives having special functions such as stabilizers, brighteners, or stress relievers.

In a preferred embodiment, the electroplating cell 30 comprises a wall having an electrically conductive portion that serves as the cathode 50. The cathode 50 has a holder, such as an aligned annular ridge, clamp, or vacuum port, that securely holds the substrate 25 onto the cathode 50 to maintain strong electrical contact therebetween. An anode 55 opposes the cathode 50 in the cell 30, both the cathode and anode being immersed in (or exposed to) the electroplating solution 40 of the cell. An inner wall 60 in the cell 30 in conjunction with the cathode 50 defines a container that holds electroplating solution 40 in the cell. The electroplating solution 40 is supplied from a solution inlet 65 at the bottom of the cell 30 and overflows over the edge of the inner wall 60 that forms a weir or dam. On the other side of the inner wall 60 is a containment region 70 in which solution overflow is held and can flow through a solution outlet 75 which is connected to a reservoir 80 used for mixing and holding the electroplating solution. A pump 82 is used to pump the electroplating solution 40 into the inlet of the cell 65. Between the cathode 50 and the anode 55 is a mixer 85, such as a paddle that moves vertically up and down in front of the substrate 25 held on the cathode wall to mix and agitate the electrolytic solution. Thermostatic control, temperature sensor, and heating means (not shown) are connected to the reservoir 80 to maintain the electroplating solution 40 at about 25° to 40° C. A suitable electroplating system 20 is described in U.S. Pat. No. 4,102,756 to Castellani, et al., which is incorporated herein by reference.

At least a portion of the anode 55 of the cell 30 is typically fabricated from a consumable, electrically conductive material, such as cobalt or nickel, that is consumed during the electroplating process to form at least a portion of the metal plating cations that travel through the solution 40 and deposit on the substrate 25 attached to the cathode 50. The anode 55 can be any structure that provides the necessary surface area exposed to the electroplating solution 40, to allow for a uniform distribution of current on the object being plated and to provide the current at a minimum overpotential. Suitable anode structures include flat plates, cylinders, or wall surfaces having the requisite anodic surface area. For electrodeposition of magnetic alloys, the anode 55 is preferably fabricated from nickel, or cobalt, which is consumed in the electrolytic solution to form plating cations that migrate through the solution and deposit on the substrate 25 to form a plated coating thereon. However, when the anode 55 is only used to maintain a potential and proper current distribution in the cell 30, the anode 55 can also comprise an electrically conductive material resistant to electrochemical corrosion in the cell 30, such as graphite or platinized titanium.

The anode 55 and cathode 50 are powered via a voltage supplied through electrical lead wires connected to the positive and negative poles of an electrical power supply 90. Most electroplating processes require unidirectional or direct current (DC) power supply, but the present invention can also be used for "pulse plating," "pulse-reverse plating," and other more complicated waveforms 90. Common power supplies 90 include motor generators and silicon rectifiers which convert alternating current to DC. Depending on the number of rectifying elements, single or three-phase, and the circuitry, the type of alternating current (AC) waveform can be half wave or full wave. A typical current density applied through the electrodes 50, 55 varies from about 2 to about 500 mAmps/cm$^2$, and more typically from 8 to 40 mAmps/cm$^2$. The cathodic or deposition reactions are characterized as reduction reactions since electrons are consumed and the valence states of the ions involved are reduced. The anodic reactions are oxidation reactions wherein electrons are liberated and the valence states are increased.

A magnetic field generator 95 can also be positioned adjacent to the cell 30 and near the substrate 25, to apply a magnetic field in the plane of the substrate to impart magnetic anisotropy to the magnetic film electrodeposited on the substrate. The magnetic field generator 95 is typically used for deposition of magnetic thin films during magnetic head and sensor fabrication.

Figure 3:
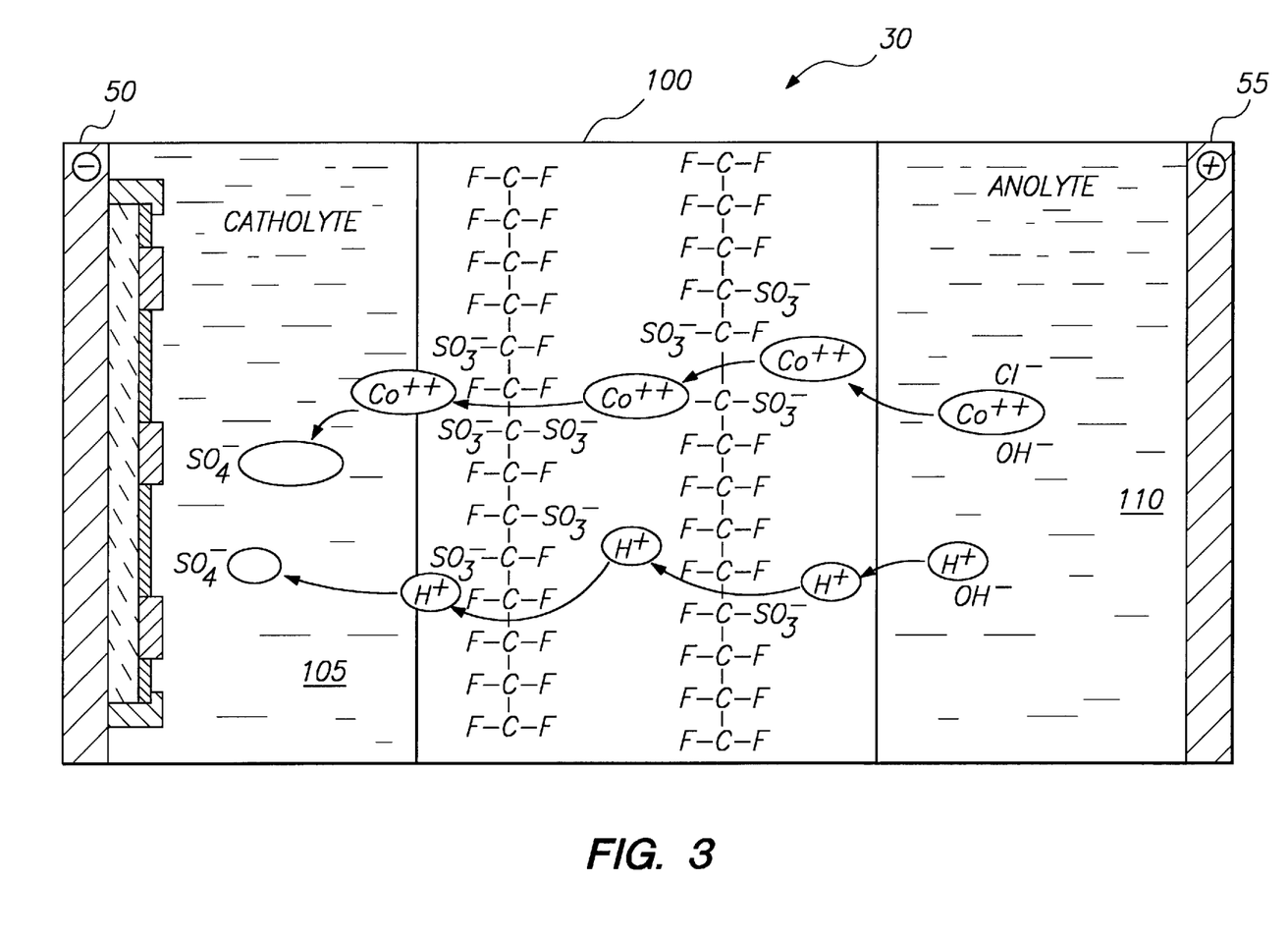
FIG. 3 is a schematic view of the ions traveling through a semi-permeable membrane.

In one aspect of the present invention, a cation-selective semi-permeable membrane 100 is positioned in the cell 30 to form a divider that divides the cell into two or more compartments that are separated by the semi-permeable membrane, as schematically shown in FIG. 3. In this embodiment, the electroplating solution 40 can comprise a single homogeneous solution, or two different solutions, namely the anolyte and catholyte solutions. Preferably, the cathode compartment 105 comprises catholyte solution in contact with cathode 50, and the anode compartment 110 comprises anolyte solution in contact with the consumable anode 55. The cation-selective semi-permeable membrane 100 in the electroplating solution substantially reduces, or preferably altogether prevents, transport of plating anions through the membrane while simultaneously allowing plating cations to travel through the membrane. By blocking travel and confining the oxidizable plating anions to the cathode compartment (or catholyte solution), the cation-selective semi-permeable membrane substantially reduces oxidation of the oxidizable plating anions at the anode.

A preferred cation-selective semi-permeable membrane 100 comprises a heterogeneous structure comprising mobile cations in a fixed, negatively charged, polymer matrix. The polymer matrix is negatively charged by substituted anionic groups, such as for example sulfonate groups. Suitable cation-selective membranes are commercially available from Du Pont de Nemours Company, Bloomington, Del., and Ionac Chemical, a division of Sybron Corporation, New Jersey. Preferred cation selective membranes include Nafion™, commercially available from Du Pont de Nemours Company, including for example, Nafion™ 350, a polyfluorocarbon based cationic-selective membrane with a Teflon™ based reinforcing backing. In these membranes, the cationic selectivity is obtained by substituting some of the fluorine atoms in the polyfluorocarbon matrix with negatively charged sulfonic acid groups, i.e., $SO_3$. The sulfonic acid groups are immobile because they are bound to the hydrocarbon chains in the polymer matrix with strong covalent bonds. Cations, in the form of the hydrogen ion or metal ions, which are bound with weaker ionic bonds, travel or move through the membrane 100 by jumping from one cationic site to another. Thus cations are allowed to travel in either direction across the membrane 100, while the mobility of anions across the membrane is restricted because of the low concentration of mobile anionic sites and the hydrophobic nature of the membrane. The path of two different cationic species through the Nafion™ membrane 100, namely the hydronium cation $H^+$, and the cobaltous cation $Co^{+2}$, is schematically illustrated in FIG. 3.

Operation of the cation-selective membrane 100 will be explained in the context of deposition from electroplating solution containing cobalt, iron, nickel, or mixtures thereof; and phosphorous or boron ions. The oxidizable plating anions typically comprise anions oxo-acid salts, such as for example, sodium hypophosphite, sodium orthophosphite; and can also include sodium molybdate, stannous chloride, dimethyl amine borane (DMAB), ammonium metavandate, and mixtures thereof. For example, phosphorous is typically obtained from sodium phosphite or sodium hypophosphite; and boron from sodium borohydride, dimethylamineborane, or other substituted amine boranes. While these electroplating solutions are provided to explain operation of the membrane 100, they should not be used to limit the scope of the invention to a particular electrolytic solution formulation, because one skilled in the art can apply the invention to other electrolytic solutions having different oxidation or reduction stability problems.

In prior art cells, oxidizable plating anions of the dissolved salts of non-ferromagnetic materials readily oxidize at the anode and cause undesirable properties for the deposited film. For example, sodium orthophosphite or sodium hypophosphite compounds are thermodynamically unstable and become easily oxidized at the anode 55. In some cases, this oxidation step is irreversible; for example, once sodium orthophosphite (in which phosphorus is in a +3 oxidation state) is oxidized to sodium phosphate (in which phosphorus is in a +5 oxidation state), the resulting compound cannot be reduced back to orthophosphite in aqueous solution. The result is both a reduction in the concentration of a needed phosphorous plating species and an increase in the concentration of an unwanted or precipitated ionic species that reduces the life and performance of the electroplating system 20.

The cation-selective semi-permeable membrane 100 in the cell 30 solves this problem by reducing transport and substantially preventing oxidation of the oxidizable anion species in the electroplating solution 40. For example, for the deposition of CoFeP from a suitable electroplating solution 40, phosphorous is typically present as hypophosphite anion ($HPO_2^{-2}$) or orthophosphite anion ($HPO_3^{-2}$). In conventional cells, application of a voltage to the anode 55 and cathode 50 causes the anionic species to diffuse across the cell 30, contact the anode 55, and become oxidized to the phosphate ion ($Po_4^{-3}$). Because the phosphate anions are too thermodynamically stable to be reduced at the cathode 50, the phosphate anions actually reduce the current efficiency of the cell 30 at the cathodic surface. Also, the phosphate anion often combines with other metal ions to precipitate out as insoluble phosphate compounds. The cation-selective membrane 100 substantially blocks and prevents transport of the oxidizable plating anions, such as for example orthophosphite and hypophosphite anions, to the anode so that these ions are confined to the solution on the cathode side of the membrane 100, while allowing other cationic species to flow through, so that the net cell impedance from the anode 55 to the cathode 50 is only slightly increased. Oxidation of metal or water at the anode 55 provides the charged ions which balance the charged ions reduced into metal at the cathode 50. The cation-selective, semi-permeable membrane 100 prevents oxidizable plating anions from contacting the anode 55 and oxidizing to form undesirable ionic species.

In another example, the boron of CoFeB electroplating solutions 40 is obtained in the solution using a solution of dimethyl amine borane which is also thermodynamically unstable. Oxidation of dimethyl amine borane in an aqueous bath forms dimethyl amine and boric acid, thereby depleting dimethyl amine borane from the bath. The cation-selective semi-permeable membrane 100 prevents transport of the dimethyl amine borane thereby reducing or altogether preventing its undesirable oxidation 55.

In this manner, the electroplating cell 30 of the present invention improves electrodeposition processes used for the deposition of electronic and magnetic materials, by inhibiting travel of unstable chemical species across the cell. These improvements are needed to use electroplating solutions 40 for the deposition of complex alloys such as CoFeP, CoFeB, FeNiP, FeNiB and the like, from precursor salts that are unstable in an electrochemical solution. Without the present process, both the life of the electroplating solution 40 is short, and electrodeposition behavior is entirely unpredictable.

Catholyte and Anolyte Solutions

In yet another aspect of the invention, the composition of the catholyte solution and anolyte solution in each of the two compartments 105, 110, respectively, of the cell 30 are tailored to reduce transport, and resultant oxidation, of unstable ionic species between the two solutions. The ability to individually tailor the compositions of the anolyte and catholyte solutions is provided because the solutions are separated by the semi-permeable membrane 100. In the deposition of certain materials, for example $CoFe_x$ materials, the electroplating solution 40 at the deposition surface should contain ions such as $Fe^{+2}$, $Co^{+2}$, $Na^+$, and $H^+$ cations. However, ions such as $Fe^{+2}$ (ferrous) cations which are readily oxidizable, travel by diffusion processes to the anode 55 where they are oxidized to $Fe^{+3}$ (ferric) cations which precipitate out from the solution. It is desirable to prevent or reduce such diffusional transport of these oxidizable ions (for example $Fe^{+2}$ cations) to the anode 55 to reduce formation of unstable oxidized species in the electroplating solution; however, the plating ions, such as the $Co^{+2}$ and $Fe^{+2}$ cations must still travel to the cathode 50 in order to deposit an electroplated coating containing Co and Fe on the substrate The present invention provides control over these conflicting ionic transport requirements by allowing tailoring of the compositions of the anolyte and catholyte solutions to reduce transport and resultant oxidation of oxidizable ions at the anode, while simultaneously allowing transport of the desired cations and anions through the cell to achieve optimal deposition properties.

One method of tailoring the compositions of the anolyte and catholyte solutions is to provide a first concentration of non-oxidizable plating cations in the catholyte solutions, and a second concentration of oxidizable plating cations in the anolyte solution. The combined concentration of non-oxidizable plating cations in the two solutions is maintained sufficiently higher than the concentration of oxidizable plating cations in the catholyte solution. Therefore, upon application of the voltage across the anode and cathode, the non-oxidizable plating cations form the dominant or majority of the cationic charge carrier species traveling across the cation selective semi-permeable membrane. By maintaining the second concentration (oxidizable cations in anolyte) lower than the first concentration (oxidizable cations in catholyte), the total amount of oxidizable plating cations that diffuse from the anolyte to the catholyte solution is significantly reduced.

Preferably, the anolyte solution comprises substantially only non-oxidizable plating cations, and a catholyte solution contains both non-oxidizable plating cations and oxidizable plating cations. This further reduces the presence of oxidizable species at the anode. More preferably, the non-oxidizable plating cations in the anolyte solution are of the same type as the non-oxidizable plating cations in the catholyte solution, but are maintained at a much higher concentration level than any other oxidizable ions in the two solutions, so that the non-oxidizable plating cations form the largest number of cationic charge carriers that travel across the semi-permeable membrane.

The reduced concentration or presence of undesirable oxidized ions at or near the deposition surfaces on the substrate, significantly improves the magnetic properties of the material deposited on the substrate. In conventional electrodeposition systems, the presence of oxidized ions, such as ferric ions, at the substrate surface result in deposition of relatively "hard" magnetic material. The present process reduces or eliminates the pressure of oxidized ions at the substrate surface, thereby allowing deposition of relatively "soft" magnetic materials that are particularly useful for writing heads that operate at high switching speeds.

This aspect of the present invention will be illustrated by examples for the deposition of cobalt and iron containing magnetic films; however, it should be understood that the invention can be applied to other film and coating compositions, as apparent to those of ordinary skill in the art, and should not be limited to the illustrative examples provided herein. An exemplary composition of catholyte solution used to deposit CoFeP alloy films, comprises:

| | |
|---|---|
| Cobaltous sulfate | 1.0 M |
| Ferrous chloride | 0.060 M |
| Phosphorous acid | 0.050 M |
| Trisodium citrate | 0.050 M |
| Boric acid | 0.125 M |
| Sodium Laurel Sulfate | 0.1 g/l |
| pH | 1.6–2.3 |

In addition to cobalt ions, the catholyte solution contains anionic stabilizing and buffering agents such as sulfates, acetates, citrates, and/or tartrates; additional oxidizable anions such as molybdates, phosphites, and/or hypophosphites; and additional oxidizable plating cations such as ferrous ($Fe^{+2}$) or stannous (Sn+2) ions. During operation of the cell, the pH of the catholyte solution is maintained at a constant or slowly increasing levels forcing cobaltous ions to carry a large fraction of the ion current carried through the membrane 100.

The concentration of non-oxidizable cobalt plating cations $C_{co}^{+2}$ in the catholyte is maintained higher than the combined concentrations of the other plating cations in the catholyte, which in the exemplary system would be the sum of the concentrations of the $C_H^+$ and $C_{Fe}^{+2}$ cations. The larger concentration of desirable cobalt plating cations reduces the mass transport of undesirable oxidizable plating cations to the anode. Preferably, the concentration of non-oxidizable cobalt cations in the catholyte solution (at 1 Molar) is at least about 5 times, and more preferably about 10 times higher, than the concentration of oxidizable ferrous plating cations (at 0.06 Molar) in the catholyte.

A tailored anolyte composition is also prepared to reduce or prevent migration of the oxidizable ferrous cations to the anode 55, as described previously. A preferred anolyte composition comprises:

| | |
|---|---|
| Cobaltous chloride | 0.25 M |
| pH | 5 to 5.5 |

The relatively high pH of the anolyte solution is chosen to keep the $C_H^+$ in the range of $10^{-5}$ Molar. The use of the chloride salt in the anolyte is preferred to facilitate dissolution of the consumable cobalt anode by providing ions that (i) react with the cobalt anode to increase the concentration of cobaltous species in the anolyte, and (ii) prevent passive film formation on the anode when present at relatively high pH levels. Furthermore, the diffusion of chloride anions to the anolyte solution (which results in reduced brightness of the deposited film which is undesirable) is prevented through use of the cation selective membrane. Instead of using chloride anions, other anions that aid in dissolution of the consumable anode and do not diffuse through the membrane can also be used. The anolyte solution composition is tailored to include a high concentration of anions that readily react with and dissolve the consumable anode, and a high concentration of non-oxidizable plating cations that deposit on the substrate and reduce transport of undesirable oxidizable plating cations.

Thus, preferably, the anolyte solution contains substantially only non-oxidizable plating cations (e.g., $Co^{+2}$), and the catholyte solution contains both non-oxidizable plating cations (e.g., $Co^{+2}$), oxidizable plating cations (e.g., $Fe^{+2}$), and oxidizable anions (e.g., $HPO_3^{-2}$); and the cell is constructed with the cation selective semi-permeable membrane separating the anolyte and catholyte solutions. The tailored anolyte and catholyte compositions provide an electroplating solution that can be operated so that easily oxidized species such as ferrous ions that can be oxidized to the ferric ion at the anode, have little or no contact with the anode 55. The solution chemistry is further controlled so that desirable plating ions, such as the cobalt cations, are readily transported through the membrane to deposit a magnetic layer on the substrate. Also, the solution chemistry is tailored to facilitate dissolution of the anode and to reduce cleaning or replacement of the anode due to the formation of passivating thin films of the anode that prevent further dissolution.

Purging the Anolyte Solution

Figure 4A:
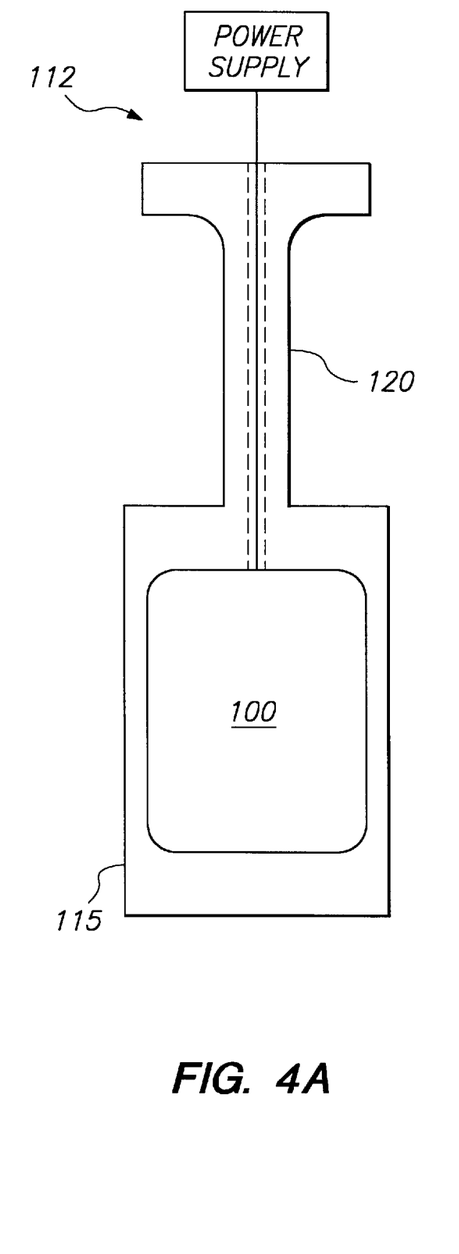
FIG. 4a is a front view of an anode compartment of the electroplating cell showing the semi-permeable membrane in a framed housing.
Figure 4B:
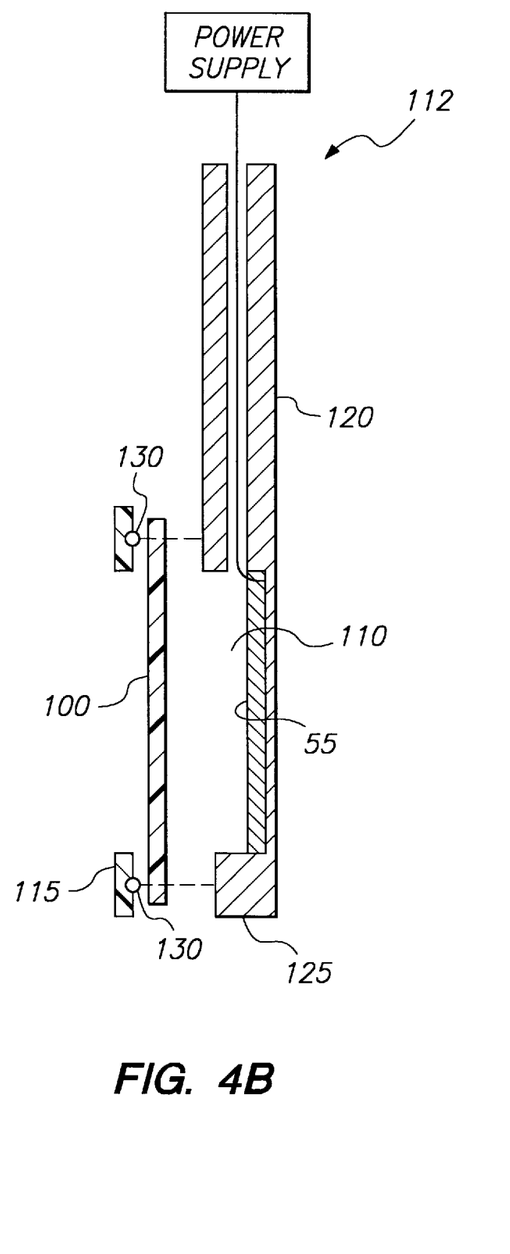

With reference to FIGS. 4a and 4b, a preferred embodiment of the electroplating cell 30 comprises an assembly of frames 112 forming a low volume anode compartment 110, and a rear surface that serves as the anode 55. The anode compartment 110 serves to hold the semi-permeable membrane 100 in the electroplating cell 30, and prevents mixing of the anolyte solution held within the anode compartment 110 with the catholyte solution held within the cathode compartment 105. The semi-permeable membrane 100 is mounted along the perimeter of a rectangular membrane holding frame 115. The membrane holding frame 115 couples to a second paddle-shaped support frame 120 to form the anode compartment 110 with a small containment volume that holds anolytic solution. The support frame 120 comprises a perimeteric ridge 125 extending along the border or edge of the frame. An O-ring 130 on the support frame 120 couples into a corresponding O-ring groove in the membrane holding frame 115 to provide a tight seal between the frames. The anode compartment 110 is held immersed in the catholyte solution of the electrochemical cell 30, as shown in FIG. 2.

The anode compartment 110 has several advantages. First, the anode compartment 110 maintains the primary current distribution substantially uniform because the area of the anode 55 is as large as the area of the cathode 50, and it allows the anode 55 to be symmetrically positioned opposite the cathode 50. Furthermore, because the anode compartment 110 is relatively small sized, and the capital costs for plating magnetic alloys increase with the volume of the electroplating cell, the anode compartment 110 provide low cost operation. The removable anode compartment 110 also allows the anolyte solution to be accessible for chemical analysis and refilling without contaminating the catholyte.

To further reduce oxidation of oxidizable plating cations at the anode, the anolyte solution in the anode compartment 110 is purged continuously, or in steps, during operation of the cell 30 in the electroplating process. Purging the anolyte solution further reduces the concentration of oxidizable and oxidized plating cations in the anolyte solution by both removing oxidizable and oxidized plating cations present in the anolyte solution, and thereby preventing their rediffusion back into the catholyte solution to adversely affect the material deposited on the substrate. In the purging step a sufficient amount of fresh anolyte solution is periodically or continuously replaced to substantially entirely remove any oxidized or oxidizable plating cations in the anolyte. Preferably, the anode compartment 110 is constructed to have a relatively small containment volume, of less than about 1000 $cm^3$, more typically from 10 to 100 $cm^3$, and most typically about 50 $cm^3$, to reduce the amount of anolyte solution that is purged through the compartment and reduce waste of anolyte solution. It has been found that present process allows use of a catholyte solution for over two months instead of requiring replacement of the catholyte solution after every few days of cell operation. This significantly improves the electroplating process by providing a 10 to 30 fold increase in the actual use time for the catholyte solution.

Non-oxidizing Gas

In yet another aspect of the invention, a non-oxidizing gas is used to reduce oxidation of the oxidizable species in the electroplating solution 40 by preventing contact between oxidizable species in the solution and the oxygen present in air. As shown in FIG. 2, a non-oxidizing gas source 150, such as a pressurized tank of gas is connected to the cell 30 via a gas inlet 155 feeding into the enclosed region 140 of the cell 30. A gas flow controller 158, such as a mass flow controller or gas valve, controls the flow of non-oxidizing gas into the enclosed region 140 of the cell 30. The blanket of non-oxidizing gas in the enclosed region 140 (defined by the surface of the solution 40 and the cover 142 of the cell 30) limits exposure of, and consequently slows down, the rate of oxidation of the oxidizable ionic species in air. Suitable non-oxidizing gases include inert, non-reactive, and reducing gases. Preferred non-reactive gases include for example nitrogen, xenon, krypton, neon, and nitrogen, of which nitrogen is preferred due to its commercial availability. Preferred reducing gases include hydrogen and methane. The non-oxidizing gas can also comprise a combination of non-reactive gas and reducing gas. A typical flow rate of non-oxidizing gas is from about 50 to about 3000 sccm.

In a preferred embodiment, the non-oxidizing gas is prehumidified with moisture from distilled water to reduce evaporative losses of solvent from the electroplating solution 40 using a humidifier 160. The constant flow of non-reactive gas above the solution 40 results in rapid evaporative losses from the solution, especially when the cell 30 is operated at above ambient temperatures. It is inconvenient to constantly add water to the plating cell 30 to keep the concentration of bath species constant over time. Also, water addition can disturb the homogenity, uniformity, and concentration levels of the plating solution 40. This problem is overcome by prehumidifying the non-reactive gas before introduction of the gas into the enclosed region 140 of the electroplating cell 30.

Figure 5:
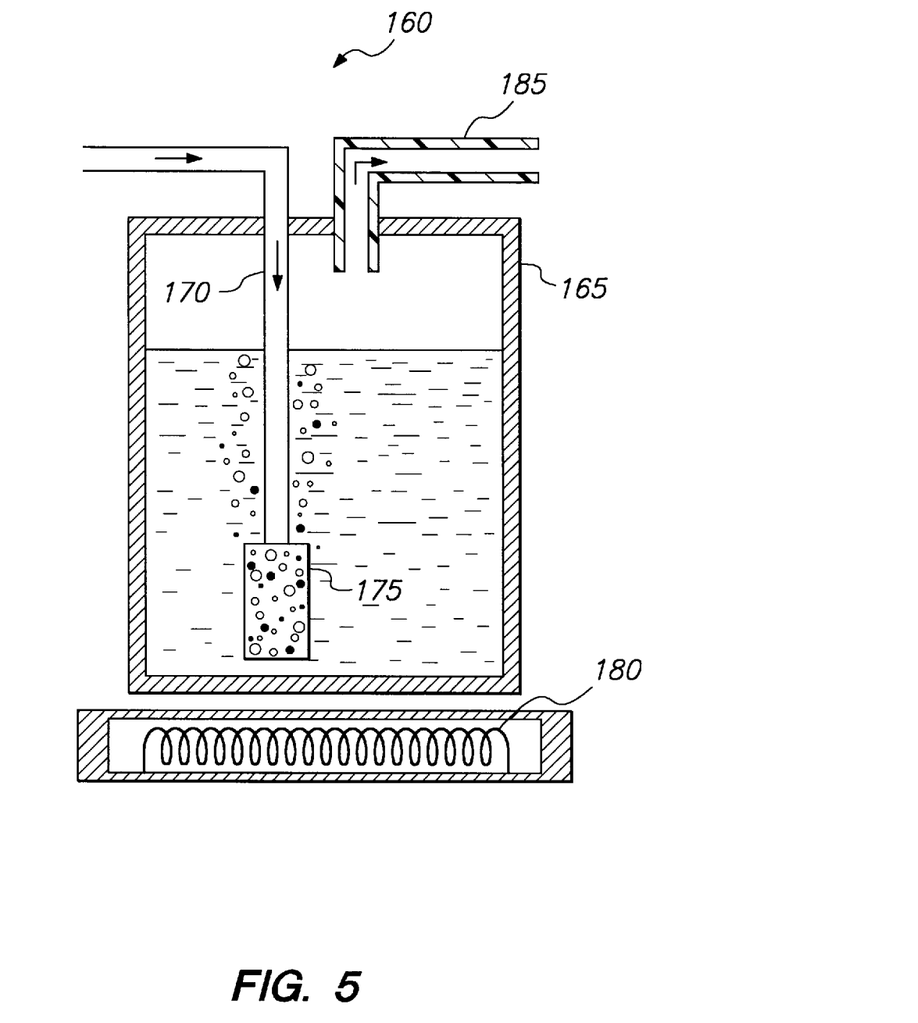
FIG. 5 is a gas bubbler used in the electroplating cell to humidify non-oxidizing gas.

The non-oxidizing gas can be pre-humidified by bubbling the gas through water in a bubbler 165 held at a constant temperature, as shown in FIG. 5. The bubbler 165 comprises a gas supply that feeds non-oxidizing gas into a porous plug 175 submerged in water via a tube 120. The bubbles of gas emitted through the porous plug 175 is moisturized during upward travel of the gas through the water. The bubbler 165 is heated by a thermostat controlled heater 180 below the bubbler. By adjusting the water temperature, the relative humidity of the gas bubbled through the bubbler 165 can be controlled. Preferably, a thermally insulated gas feed tube 185 is used to transport the humidified gas to the gas inlet 155 of the electroplating cell 30 so that the temperature and relative humidity of the gas entering the electroplating cell is held below condensation levels. More preferably, the insulated gas feed tube 185 comprises an interior hydrophobic surface of a material such as PTFE to further minimize condensation in the gas in the tube 185. Alternatively, or in combination with the bubbler, a stream of non-oxidizing gas can be combined with a stream of water vapor using a gas mixing manifold (not shown) to form pre-humidified non-oxidizing gas introduced into the enclosed region of the cell 30.

Electroplating of Magnetic & Electronic Components

The electroplating process of the present invention can be used to form active electronic devices on semiconductor substrates 25, such as for example silicon and gallium arsenide wafers; and also used to form magnetic components on substrates, such as for example, silicon, $SiO_2$, SiC, $TiO_2$, $Al_2O_3$, TiC, and other ceramic substrates. The substrate 25 can also comprise non-magnetic metals such as copper, gold, silver, or alloys thereof, and polymeric materials such as for example, polyimides or polysulfones. The substrates 25 are typically sized from about 75 to about 305 mm (3" to 12") in diameter and are from about 1 to 5 mm thick. In addition, the substrates 25 can also comprise a thin adhesion promoting or seeding metallization layer, such a sputtered layer of Ti, Ta, Cr, Cu, Rh, Ag, Au, or Permalloy in a thickness of about 50 to 1000 Å.

The present method is also useful for depositing metal-containing material for forming features that electrically interconnect active devices, such as electronic circuit components; or to form magnetic circuit components, such as the ferromagnetic cores of thin film heads, and magnetic shields on magnetoresistive sensors. In one method, the electroplating process is used to form a plated magnetic coating deposited on between a pattern of photoresist features, such as patterned lines and/or holes, on the substrate 25. In another method, the electroplated coating is deposited as a continuous layer on the substrate 25, and thereafter, the deposited layer is covered with a photolithographic resist pattern, and the exposed plated coating portions are etched using conventional ion-milling, plasma etching, RIE, and wet etching methods. Suitable etching and deposition processes are described in VLSI Technology, 2nd edition, Ed. by S. M. Sze, McGraw-Hill, New York (1988), which is incorporated herein by reference.

The cleaned and prepared substrate 25 is fixed on the cathode 50 of the electroplating cell 30. A suitable composition of electroplating solution 40 is mixed in the reservoir 80 and introduced into the cell 30. Typically, the electroplating solution 40 is maintained at a pH of from about 1.6 to about 2.9, and the operating temperature of the electrochemical cell 30 is from about 25° C. to about 45° C. In the electrolytic solution, the chemicals dissolve to form cations and anions, including for example nickel, ferrous, and cobalt cations; and sulfate, phosphite, or chloride anions. The electrical current flowing through the electroplating solution 40 causes the nickel, iron and cobalt cations to travel to the cathode 50 and deposit on the substrate 25 as an alloy of metallic nickel, iron, and cobalt. After plating is completed, the substrate 25 is removed from the bath and immersed in a rinse water bath contained in a second tank to wash away residual electrolytic solution. The resultant plated coating has a uniform composition even when containing a complex metal alloy.

Electrodeposition of Magnetic Head Structures

The process of the present invention is particularly useful for forming depositing portions of thin film magnetic heads that comprise read and write elements. In typical magnetic disc and tape drives, magnetic write elements in combination with the magnetoresistive reading elements or sensors, form a magnetic head assembly capable of reading and writing magnetic data. Exemplary magnetic head structures are described in U.S. Pat. No. 3,908,194 to Romankiw et al., and U.S. Pat. No. 5,287,237 to Kitada et al., both of which are incorporated herein by reference.

Figure 6A:
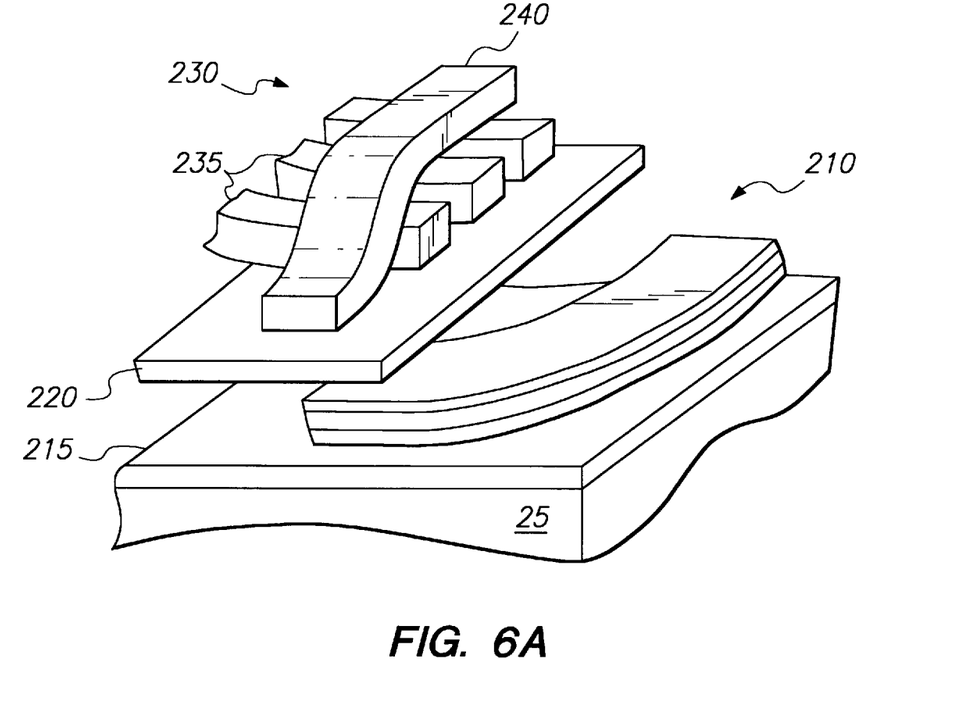
FIG. 6a is an exploded perspective partial schematic view of a magnetic head formed by the electroplating apparatus and process of the present invention.
Figure 6B:
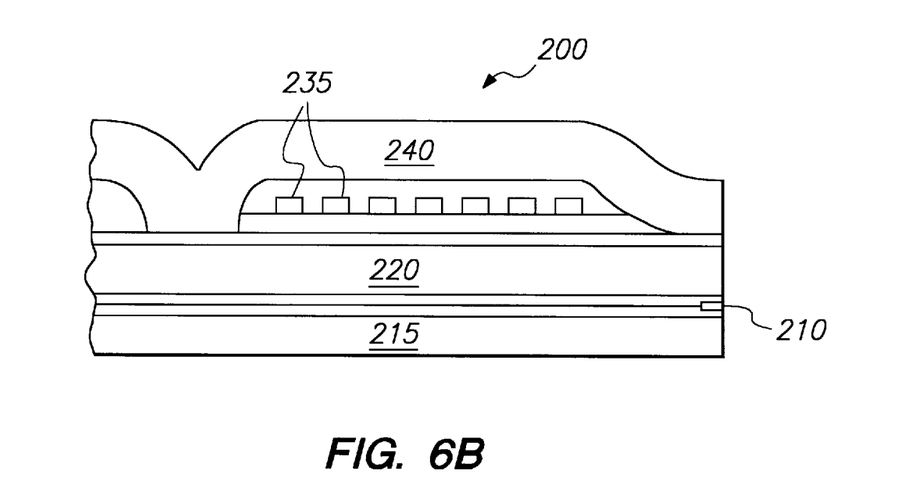

Fabrication of a magnetic head structure 200 using the electroplating process of the present invention head will now be illustrated. As shown in FIGS. 6a and 6b, a typical magnetic head is fabricated on a substrate 25, such as alumina-TiC, or silicon substrates, typically from about 7 to 8 cm (3 inches) in diameter and about 2 mm thick. Suitable substrates include the "AC-7" commercially available from Sumatomo, Japan. Typically, the substrate 25 is coated with a thin layer of alumina in a thickness of about 10 to 12 microns. The alumina coating is planarized using conventional chemo-mechanical polishing methods to obtain a highly smooth and planar surface. A magnetic shield is deposited on the planarized alumina using either vacuum or electrodeposition techniques familiar to those skilled in the art.

Magnetoresistive read elements 210 are formed on the substrate 25 to read magnetic data having high linear densities. A magnetoresistive read element 210 typically detects magnetic field signals through resistant changes in a magnetoresistive element, that are induced as a function of the magnetic flux being sensed. During a "read" operation, a current passed through the magnetoresistive element via conductive leads fluctuates in relationship to the change in resistance induced by magnetized storage media transported past the element. A spike in the current or voltage indicates a magnetic transition from a zero to a one signal or vice versa. The linear recording densities in narrower recording tracks make it critical that the active devices of the element are sufficiently miniaturized to allow accurate reading of narrow tracks. Also, because magnetic "writing" heads typically form zigzag domains at the edge of the magnetic track, it is desirable for the magnetoresistive read element 210 to be narrower than the magnetic write element. A preferred magnetoresistive element is described in, for example, commonly assigned U.S. Pat. No. 5,483,402 to Batra.

The magnetoresistive reading element 210 on the substrate is embedded between the two shields 215, 220. A magnetically permeable layer serves as the first bottom shield 215 and is about 2 microns thick. The magnetically permeable material includes Permalloy, CoFeX, CoNiX, or NiFeX, that is typically electroplated onto the substrate 25. After an insulating layer is deposited on the bottom shield, the magnetoresistive read element 210 is formed and photolithographically patterned. The magnetoresistive reading element 210 can include layers of soft, hard, and antiferromagnetic layers, such as (i) $Fe_3O_4$, NiCo, CoPt, exchange coupled $Fe_3O_4$ and Fe, or soft biased Permalloy layers; (ii) non-magnetic insulative separator layers, such as SCHOTT glass; and (iii) magnetoresistive layers comprising Permalloy. Each of the layers is typically from about 50 to about 20,000 Å thick. Conductors of copper, gold, or aluminum, (not shown) are formed on the magnetoresistive layer by electroplating or evaporation through a resist mask to form electrically interconnects to the layers. A more highly magnetically permeable layer, such as a Permalloy or CoFeX layer, serves as a second upper (shared) shield 220 covering the magnetoresistive element. A non-conductive, magnetically inert layer such as alumina, silica, silicon nitride or silicon oxide, is deposited on the second shield layer 220 to serve as the write gap.

The write element 230 of the thin film head will now be described. The write head element 230 comprises electrically conductive coils 235 deposited on the second shield layer. The coils 235 are typically fabricated from an electrically conductive material such as copper or gold, have spiral or convoluted windings, and are formed by conventional methods, as described in commonly assigned U.S. Pat. No. 5,448,822, to Wu et al., which is incorporated herein by reference. Conductive pads are formed at the ends of the coils 235 to power the coils using an external electrical power source (not shown). The coils 235 can be covered by an overlying insulator layer, such as a photoresist or silicon dioxide layer. A horseshoe-shaped magnetic top pole 240 is formed around the legs of the coils 235. When the coils 235 are energized during a "write" operation, a magnetic field having north and south poles forms around the magnetic top pole 240. Magnetic storage media, such as disc drives and tapes, passing by region of the magnet becomes "written" upon or magnetized by the resultant magnetic field.

To fabricate the magnetic top pole 240, a patterned photoresist layer is formed on the substrate, and thereafter ferromagnetic material, such as CoFeX, CoNiX or NiFeX, is deposited on the exposed portions of the substrate between the patterned photoresist features using the electroplating process of the present invention. In the electroplating process, the substrate 25 is attached to the cathode 50. An electroplating solution 40 comprising cobaltous sulfate at 1.0M; ferrous chloride at 0.060M; phosphorous acid at 0.050M; trisodium citrate at 0.050M; boric acid at 0.125M; sodium laurel sulfate at 0.1 g/l; and water was prepared in the reservoir 80 with a pH of about 2.3 to 2.6. The electroplating solution 40 was circulated in the electroplating cell 30 and maintained at a temperature of 15° to 40° C. A current density of 4 to 36 mA/cm2 was applied to the cathode and anode electrodes 50, 55 for a sufficient time to deposit CoFeX alloy on the exposed portions of the substrate 25. After electrodeposition, the residual resist on the substrate 25 was removed by immersing the substrate in a solvent such as acetone or N-methlypyrrolidinone for about five minutes.

The CoFeP magnetic top pole deposited by the present system provided superior "writing" properties due to the higher resistivity of the deposited magnetic material (which suppresses eddy currents induced by the coils in the magnetic material) and its relatively high magnetic moment. These superior properties were measured for a CoFeP magnetic thin film head formed by the present process. Two important measures of the magnetic head write performance are overwrite (owr) and non-linear transition shifts. Overwrite measures the ability to write over previously written information, without substantial remnant signal, and is defined as:

$$owr = -20 \log \{(\text{residual\_1F})/(\text{original\_1F})\} \quad (1)$$

The process involves the following steps (1) writing an initial pattern on a disk, (2) measuring the amplitude of the Fourier transform at that frequency on a spectrum analyzer, (3) overwriting the original pattern with a frequency that is four times the original frequency, and (4) using the same spectrum analyzer to determine magnitude of the residual 1F (original) pattern. The ratio of the amplitudes of the residual pattern to the amplitude of the original pattern, as measured by the spectrum analyzer, determines the amount of overwrite. A larger value for overwrite indicates superior performance with little residual signal compared to the original signal.

Figure 7A:
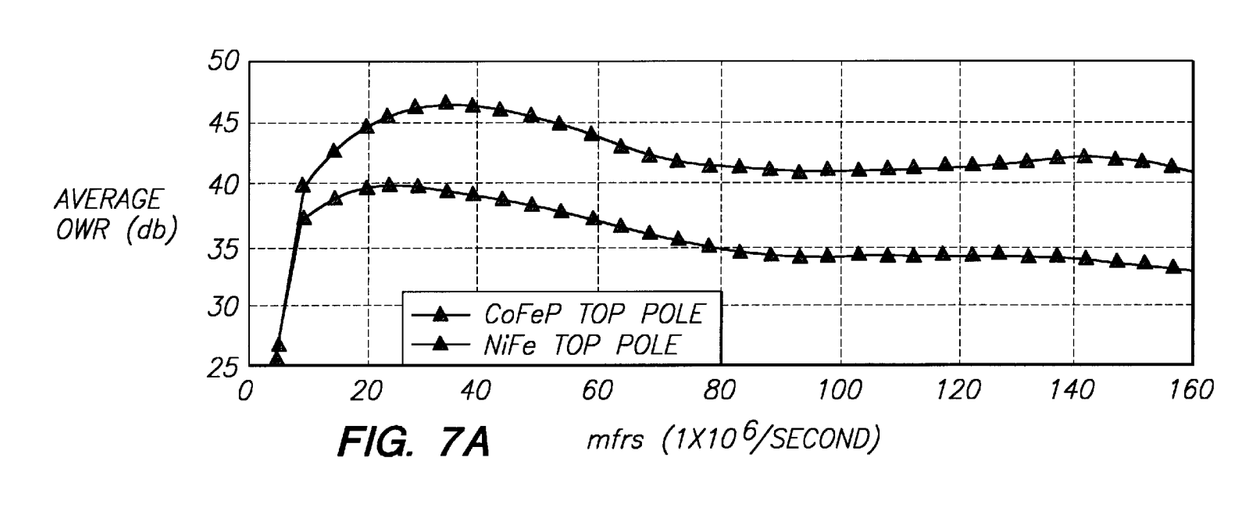
FIG. 7a is a graph showing the overwrite performance of magnetic heads fabricated using the present process compared to the performance of conventional magnetic heads.

FIG. 7a compares the overwrite performance of 10 magnetic heads fabricated with CoFeP magnetic top poles and Permalloy shields, to the overwrite performance of 10 magnetic heads fabricated with Permalloy magnetic top poles and Permalloy shields. The measured data at each frequency was averaged for the ten heads of the same type. The magnetic heads having the CoFeP top poles fabricated by the present invention clearly show superior overwrite performance by approximately 7 dB over a wide frequency range.

Figure 7B:
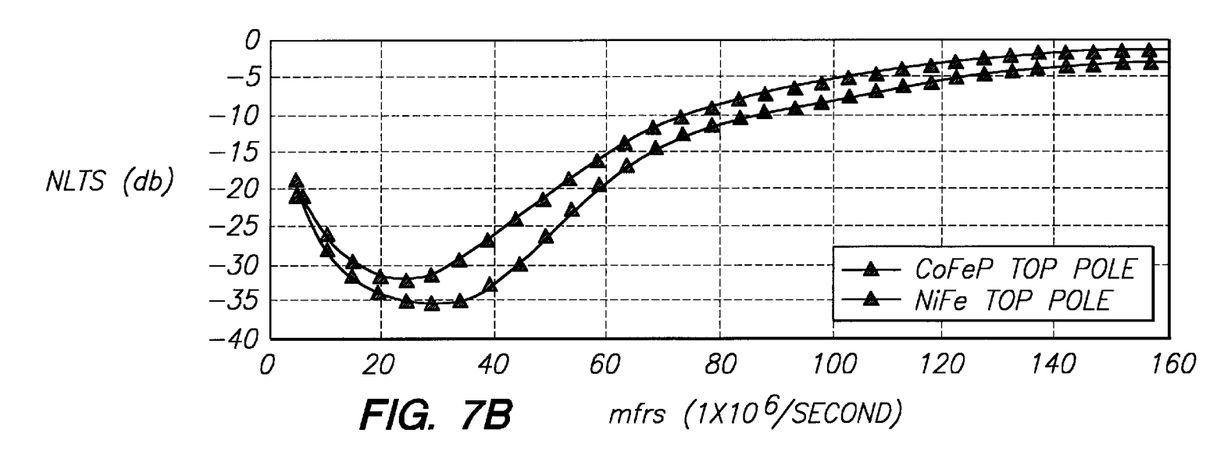
FIG. 7b is a graph showing the non-linear transition shift (nlts) performance of magnetic heads fabricated using the present process compared to the performance of conventional magnetic heads.

FIG. 7b shows the non-linear transition shift measured for the same sets of magnetic heads. Non-linear transition shift is a measure of the presence of an adjacent (previous) transition that shifts the position in time (or space on a disk) of a following transition. The shift is measured in terms of the percent of the window for each bit which is a measure of the reflection or interference of two written bits that are positioned close to one another. It is commonly reported as nlts in terms of a percent, where a small numerical value indicates superior performance. However, In the present measure of nlts performance, a large negative dB value indicates superior performance:

$$nlts = 20 \log (\% \text{ shift})$$

The specific measurement technique used for nlts was the $5^{th}$ harmonic technique as described in Palmer et al., IEEE Trans. on Magnetics, Vol. MAG-23, No. 5, September, 1987, page 2377, which is incorporated herein by reference. Measurements were performed on a Guzik tester, commercially available from Guzik Technical Enterprises of San Jose, Calif. It is seen from FIG. 7b that as with the overwrite measurements, the measured nlts performance was significantly improved for the magnetic heads constructed with CoFeP magnetic top poles. In this case, the nlts performance was improved by approximately 2 to 3 dB also over a wide frequency range.

The improvements provided by the present apparatus and process allow use of a plating solution which contains easily oxidizable species, without adversely affecting the manufacturing process. Easily oxidizable species that can be used in the present invention include hypophosphite, orthophosphite, stannous chloride, and dimenthylamine borane. Furthermore, by preventing oxidation of these ionic species at the anode, their concentration in the cell is much lower over time than their concentration in prior art plating cells. Also, build up of undesirable "spoiler" species, such as ferric or phosphate ions, in the electroplating solution due to oxidation of desirable species is also inhibited. Furthermore, the anolyte and catholyte solutions can be independently optimized, allowing an all-chloride anolyte to be used at the anode while a stabilizing anion such as sulfate anion is used in the catholyte. The use of the semi-permeable cation-selective membrane and tailored anolyte and catholyte solutions leads to greatly improved operation of the electroplating system. These improvements include: better magnetic properties and smoother surface finish of the plated film; less precipitation of solids in the plating solution; longer plating solution life and therefore lower plating bath chemical costs and less environmental impact of discarded plating solutions. Without these innovations, innovative magnetic materials such as NiFeX, CoNiFeX, and CoFeX, containing X elements such as for example P, B, Cr, Mo, V, Rh, or Sn cannot be economically produced via electrodeposition.

The present invention has been described in considerable detail with reference to preferred versions that are provided only to illustrate the invention and should not be used to limit the scope of the invention. In another example, the present invention can also be used to form magnetic core memory elements, such as those for example illustrated in U.S. Pat. No. 5,126,971, which is incorporated herein by reference. In yet another example, the present process is also useful for forming features on semiconductor substrates to form integrated circuits and electronic components. Thus, the spirit and scope of the appended claims should not be limited to the description of the preferred versions contained herein.

What is claimed is:

1. An electroplating method for reducing oxidation of oxidizable plating anions in an electroplating cell, the method comprising the steps of:
   (a) selecting a cation-selective semi-permeable membrane that allows cations to pass therethrough while substantially blocking transport of oxidizable plating anions therethrough;
   (b) positioning the cation-selective semi-permeable membrane in an electroplating cell to divide the cell into an anode compartment comprising an anode in anolyte solution, and a cathode compartment comprising a cathode in catholyte solution containing cations and the oxidizable plating anions; and
   (c) applying a voltage to the anode and cathode to cause the cations to travel through the cation-selective semi-permeable membrane and the oxidizable plating anions to be substantially blocked by the cation-selective semi-permeable membrane thereby reducing transport, and substantially preventing oxidation, of the oxidizable plating anions at the anode.

2. The method of claim 1, wherein in step (a) the cation-selective semi-permeable membrane comprises mobile cations in a negatively charged polymer matrix.

3. The method of claim 2, wherein in step (a) the cation-selective semi-permeable membrane comprises divinyl-benzene, polystyrene, and sulfonate groups.

4. The method of claim 2, wherein in step (a) the polymer matrix of the cation-selective semi-permeable membrane comprises polyfluorocarbon.

5. The method of claim 1, wherein in step (a) the oxidizable plating anions comprise at least one of the following
   (a) anions of oxo-acid salts; or
   (b) anions of sodium hypophosphite, sodium orthophosphite, sodium molybdate, stannous chloride, dimethyl amine borane, or ammonium metavandate.

6. The method of claim 1, wherein further comprising the step of maintaining in the anolyte solution substantially only non-oxidizable plating cations.

7. The method of claim 1, further comprising the steps of:
   (i) maintaining a first concentration of non-oxidizable plating cations in the anolyte and catholyte solution; and
   (ii) maintaining a second concentration of oxidizable plating cations in the catholyte solution, the second concentration being sufficiently lower than the first concentration, to reduce travel of oxidizable and oxidized plating cations between the anolyte and catholyte solutions.

8. The method of claim 1, further comprising the step of purging the anolyte solution in the anode chamber during operation of the cell to reduce the concentration of oxidizable and oxidized plating cations in the anolyte solution.

9. The method of claim 1, further comprising the steps of maintaining non-oxidizable gas above the anolyte and catholyte solutions to limit exposure of the solutions to air thereby reducing oxidation of the oxidizable ions in the solutions.

10. The method of claim 9, further comprising the steps of:
    (i) humidifying the non-oxidizing gas to form a pre-humidified gas; and
    (ii) introducing the pre-humidified gas above the electroplating solution to limit evaporative loss of solvent of the electroplating solution.

11. The method of claim 1 further comprising the steps of:
    forming a patterned resist layer comprising resist features on a substrate, attaching the substrate to the cathode and
    depositing ferromagnetic material comprising oxidizable plating cations and anions between the resist features on the substrate.

12. A magnetic head formed by the process of claim 11.

13. A method for reducing oxidation of oxidizable plating cations in an electrochemical cell comprising (i) an anode in an anolyte solution having non-oxidizable plating cations, and (ii) a cathode in a catholyte solution having non-oxidizable plating cations and oxidizable plating cations, (iii) a semi-permeable membrane separating the anolyte and catholyte solutions, and (iv) an electrical power supply capable of maintaining a voltage across the anode and cathode,
    the method comprising the step of maintaining the concentration of non-oxidizable plating cations sufficiently higher than the concentration of oxidizable plating cations, that upon application of the voltage across the anode and cathode, the non-oxidizable plating cations form the majority of the cationic charge carriers that travel across the semi-permeable membrane.

14. The method of claim 13, comprising the step of maintaining in the anolyte solution substantially only non-oxidizable plating cations.

15. The method of claim 13, further comprising the steps of:
    (i) maintaining a first concentration of non-oxidizable plating cations in the anolyte and catholyte solution; and
    (ii) maintaining a second concentration of oxidizable plating cations in the catholyte solution, the second concentration being sufficiently lower than the first concentration, to reduce travel of oxidizable and oxidized plating cations between the anolyte and catholyte solutions.

16. The method of claim 13, further comprising the step of purging the anolyte solution in the anode chamber during operation of the cell to reduce the concentration of oxidizable and oxidized plating cations in the anolyte solution.

17. The method of claim 13, wherein the non-oxidizable plating cations comprise cobalt cations, and the oxidizable plating cations comprise hydronium cations.

18. The method of claim 13, wherein the semi-permeable membrane comprises a cation-selective membrane.

19. The method of claim 13, further comprising the steps of maintaining non-oxidizable gas above the anolyte and catholyte solutions to limit exposure of oxidizable ions in the solutions to air, thereby reducing oxidation of the oxidizable ions.

20. A method of forming a magnetic head comprising the steps of:
    (a) forming a patterned resist layer comprising resist features on a substrate; and
    (b) depositing ferromagnetic material comprising oxidizable and non-oxidizable plating cations between the resist features using the method of claim 13.

21. A magnetic head formed by the method of claim 20.

* * * * *